ated Feb. 14, 1967

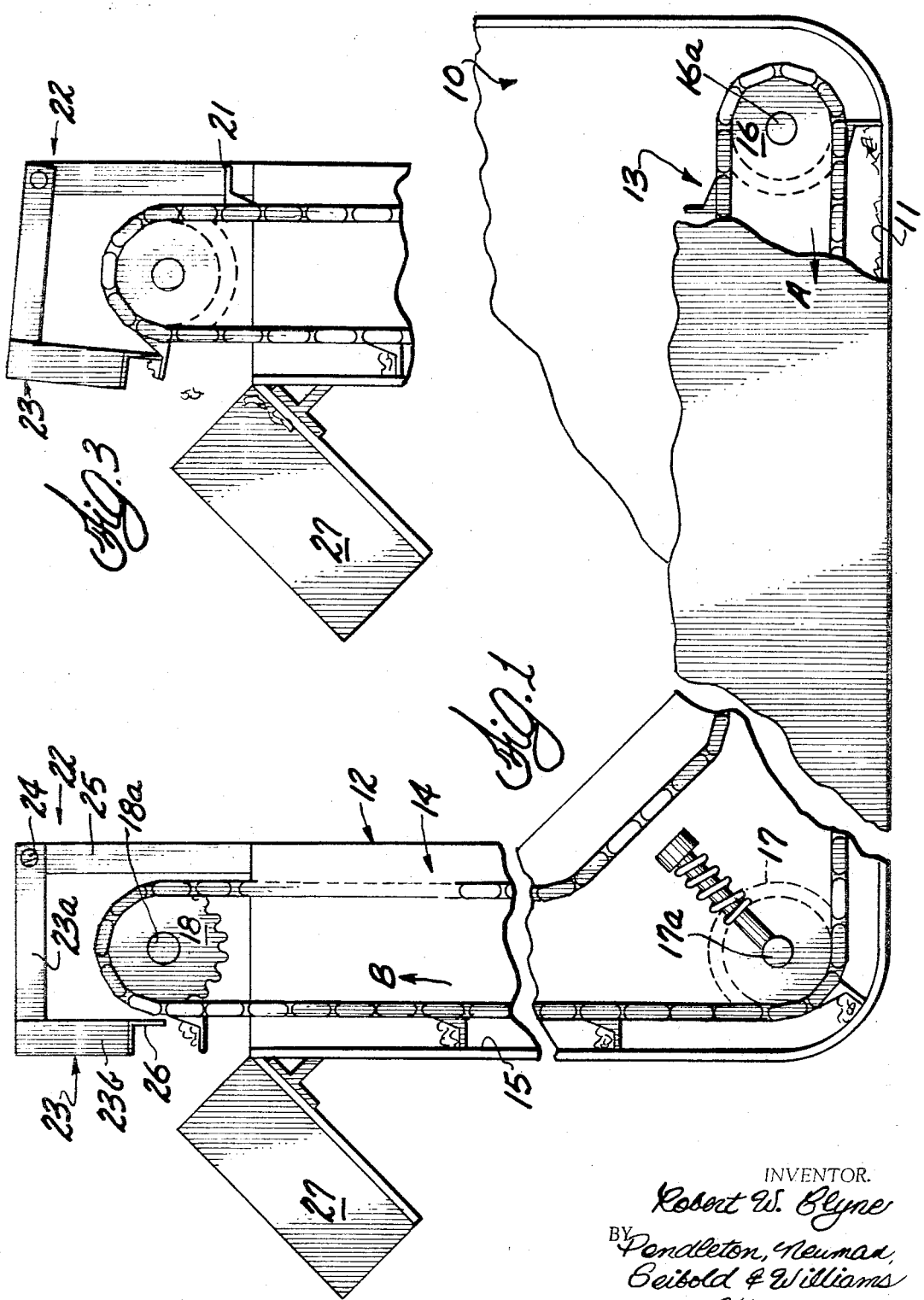

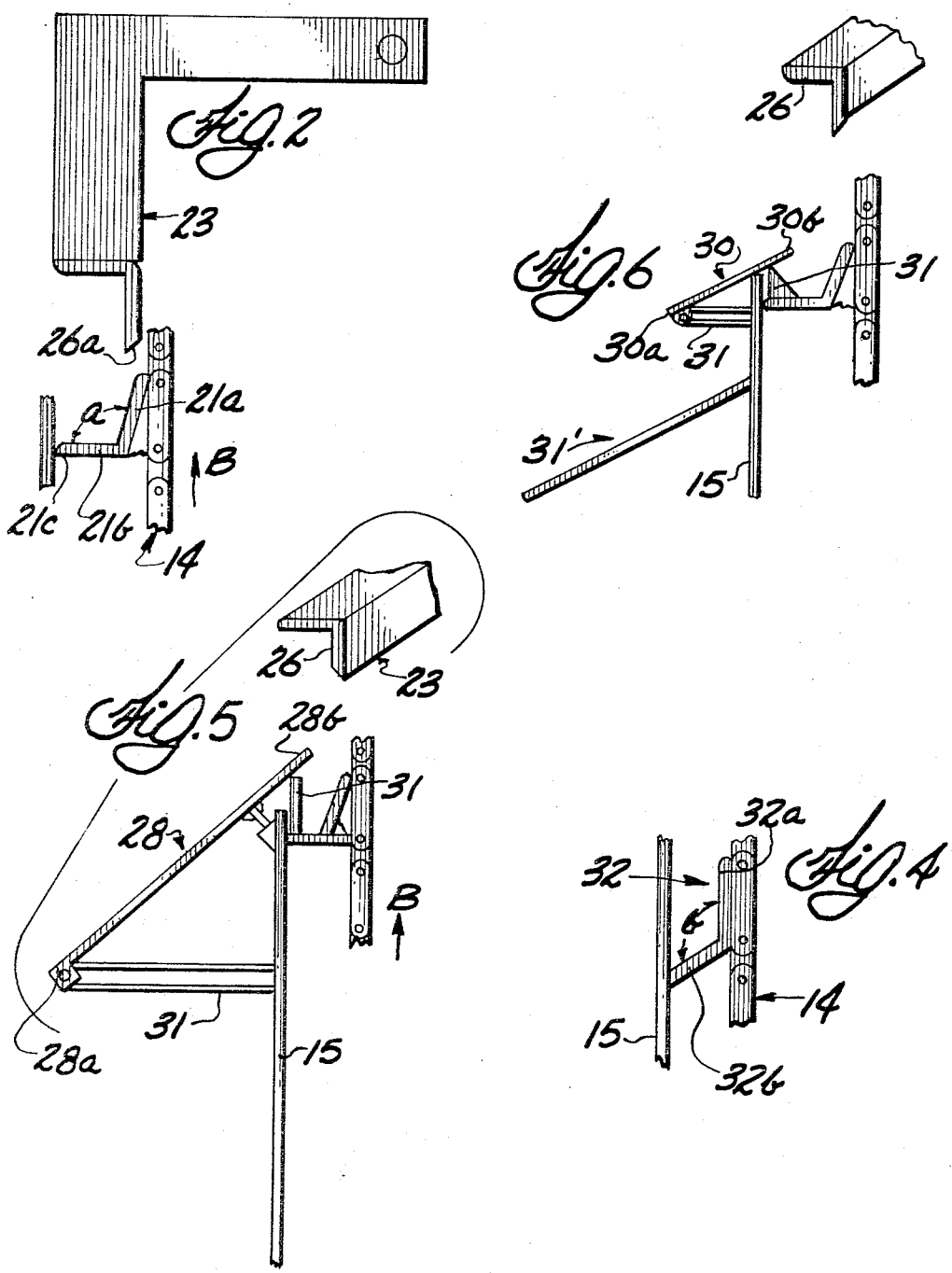

3,303,920
PRODUCT HANDLING APPARATUS
Robert W. Clyne, 5701 Sheridan Road,
Chicago, Ill. 60626
Filed Oct. 21, 1965, Ser. No. 499,614
4 Claims. (Cl. 198—154)

This invention relates to a product handling apparatus and more particularly to an apparatus for the mechanical handling of industrial waste or the like.

In various types of industries such as the railroad, steel and iron producing, manufacturing of heavy electrical and mechanical equipment, meat processing, chemical and petroleum, and power plant operation, large amounts of industrial waste are oftentimes generated. In the handling of such waste it is oftentimes necessary to utilize large volume settling tanks, sumps, or reservoirs into which flows water or other types of of liquid in which is entrained the waste. The water, or liquid, remains within the tank a predetermined period so as to enable a substantial quantity of the entrained waste to settle to the bottom of the tank. The remaining water, or liquid, is then withdrawn from the tank for either re-use or other disposition. The heavier waste, which has accumulated in the bottom of the tank must also be removed therefrom but in a manner separate from that of the remaining water or other liquid.

Because of the size, shape, and location of such tanks and the type of waste which accumulates therein, removal of the heavy, accumulated waste therefrom becomes a problem requiring mechanical equipment of considerable size. Suitable equipment for this purpose is commonly referred to as an angle flight conveyor assembly.

Such an assembly normally consists of a base section which rests upon and covers a substantial portion of the tank bottom surface, the latter normally being horizontal. Extending angularly upwardly (approximately 60–75° to the horizontal) from one end of the base section is an elevating or ramp section, which terminates above one side wall of the tank. Cooperating with both the base and ramp sections is an endless chain type conveyor to which a plurality of spaced elongated flights are affixed. The flights, when passing through the base section in one direction, engage the waste, which has accumulated thereon, and cause a portion thereof to be moved up along the ramp section whereupon it is discharged from the latter section upon reaching a predetermined elevation.

Because of the depth of the tank, the type of waste being removed, and the shape of the flights, it has customarily been necessary for either the end of the tank, adjacent the ramp section, to be lengthened so as to accommodate same, or to modify the tank by extending the top length thereof and connecting same to the shorter bottom length by means of a water-tight end wall plate welded in position. In either case, modifying the tank involves considerable expense with no appreciable increase in the operating efficiency of the apparatus.

Thus, it is one of the objects of this invention to provide an apparatus wherein the ramp section assumes a vertical or 90° position with respect to the base section.

It is a further object of this invention to provide a waste removing apparatus for use in a reservoir having a vertical side walls wherein the base section of the apparatus is capable of automatically removing waste from approximately the entire bottom area of the reservoir.

It is a further object of the invention to provide a simple, yet sturdy, apparatus which is efficient in operation and requires a minimum of maintenance.

Further and additional objects will appear from the description, accompanying drawings, and appended claims.

In accordance with one embodiment of this invention a product-handling apparatus is provided which is adapted to be used in combination with a reservoir having vertically disposed side walls. The apparatus includes a conveyor assembly having a portion thereof disposed in spaced substantially parallel relation with respect to one vertical side wall. The conveyor portion is adapted to move upwardly relative to the side wall. A plurality of projecting flights are carried by the conveyor portion and are arranged in longitudinally spaced relation thereon. Each flight has an inner segment mounted on said conveyor portion and an outer segment extending angularly outwardly therefrom. The distal end of the flight outer segment is adapted to slidably engage the interior surface of the side wall while the conveyor portion is moving upwardly relative thereto. The inner and outer segments of a flight form an obtuse included angle.

A stripper unit is provided for use in combination with the flighted conveyor. The unit is adjustably mounted above the upper edge of the reservoir side wall and is adapted to cooperate with successive flights as each of the latter reaches a predetermined elevated position whereupon the waste carried by the flight is removed therefrom. The stripper unit in one form includes a section which is disposed within the path of movement of the flighted conveyor portion and is adapted to initially contact a flight when it reaches the said predetermined position. As the flight continues its upward movement, subsequent to its initial contact with the unit, the section of the stripper unit moves therewith and relatively outwardly toward the distal end of the flight whereupon the portion of the waste product carried by the flight is removed therefrom.

For a more complete understanding of the invention, reference is made to the drawings wherein:

FIG. 1 is a fragmentary vertical sectional view of one form of the improved apparatus shown disposed within a reservoir;

FIG. 2 is a fragmentary side elevational view of the upper edge of a reservoir side wall with a portion of the side wall in section and showing the stripper unit in a position for making initial contact with a flight;

FIG. 3 is similar to FIG. 2 but showing the stripper unit in contact with a flight and in a changed position with respect thereto for removing from the flight the waste carried thereby;

FIG. 4 is a fragmentary vertical sectional view of a modified form of flight, and FIGS. 5 and 6 are fragmentary vertical sectional views of further modified forms of flights and associated parts therefor.

Referring now to the drawings and more particularly to FIG. 1, a settling tank, sump, or reservoir 10 is shown into which flows water, or other similar liquid, having waste particles suspended or entrained therein. The reservoir 10 may be formed of metal, reinforced concrete, or a combination of both and because of its volumetric size is normally partially recessed relative to the supporting ground level.

After the water or other liquid is deposited within the reservoir, it will in certain instances remain in a relatively quiescent state so as to enable the suspended waste particles to gravitate to the bottom or floor 11 of the reservoir. Removal of the accumulated waste particles from the bottom of the reservoir, is accomplished by means of a conveyor assembly 12.

The assembly 12, in this instance, includes a frame having a base section 13 which is adapted to overlie and rest upon the bottom of the reservoir. The section 13 conforms substantially to the peripheral configuration of the reservoir bottom. Extending vertically upwardly from one side or end of base section 13 is an angle or ramp section 14. The angular disposition of sections 13 and 14 corresponds to the angular disposition of the bottom 11 to a wall 15 of reservoir 10. In the illustrated embodiment the angular disposition is approximately 90°.

Assembly 12 also includes a plurality of sprocket wheels 16, 17 and 18 or heavy duty rollers which are carried on and supported by the frame. All of the wheels are mounted on horizontally disposed relatively spaced parallel axles 16a, 17a, and 18a, the ends of which are supported by suitable bearings, not shown. Sprocket wheel 18 is power driven by a suitable means such as an electric motor, not shown, which is disposed to one side of the upper end of ramp section 14.

Engaging the sprocket wheels are a pair of endless chains 20, only one being shown. Carried by the pair of chains are a plurality of elongated flights 21 of like configuration. The flights are arranged at equally spaced positions on the chains. Each flight carried by the chains extends substantially across the full width of the reservoir bottom. The width dimension of the reservoir bottom is determined when measuring in a direction normal to the plane of FIG. 1.

One form of flight 21 is shown in FIGS. 1–3 and includes an inner section 21a and an outer section 21b. The two sections or flanges cooperate with one another to form an obtuse included angle "a," see FIG. 2. The distal end 21c of the outer section 21b is caused to slidably engage the bottom surface of the reservoir when the lower run of the conveyor chain is moving in a direction A as seen in FIG. 1, and to slidably engage the interior surface of the side wall 15, when the same chain run is moving in direction B. In certain instances, the wall surface 15 may comprise a flat back plate which is interposed the vertical wall of the reservoir and the outer distal ends of the flights when the latter are moving in direction B, see FIG. 1.

The flight inner section 21a is made integral with a link forming a part of each chain by welding, riveting, or the like. As seen in FIG. 2, inner section 21a is disposed at an angle of approximately 10°–15° to the vertical when the flight is moving in direction B and thereby resulting in the obtuse included angle "a" being approximately 100°–105°.

In order to be assured that the distal ends 21c of the flights will slidably engage the interior surface of wall 15, idler sprocket wheel 17 is spring-loaded as shown in FIG. 1.

Mounted adjacent the upper, or discharge, end of wall 15, is an adjustably mounted stripper unit 22. The unit, in the illustrated embodiment, comprises an L-shaped arm 23, the longer leg 23a of which is pivotally connected at 24 to a stationary bracket 25. Bracket 25, may be affixed to either the sides of the reservoir or to a portion of the frame of the conveyor assembly. The shorter leg 23b of arm 23 depends from the outer end of leg 23a. To the lower end of leg 23b is affixed a scrapper blade 26, which, in the illustrated embodiment, is in the form of a section of angle iron having the lower edge 26a thereof preferably bevelled, as seen in FIG. 2, so as to effect a smoother initial contact between the blade and a flight, as will be described more fully hereinafter.

Arm 23 normally assumes the position shown in FIG. 1 wherein the scrapper blade 26 will automatically engage the upper edge of a flight inner section 21a upon the flight having reached a predetermined elevated position above the top of the reservoir wall 15. As the engaged flight continues its upward movement, the blade 26 will move down the inclined surface of the flight inner section 21a and outwardly relative to flight outer section 21b, thereby causing the waste carried by the flight to be stripped clean therefrom by the blade. This relative movement of the blade with respect to the flight is effected upon the L-shaped arm 23 being pivoted in a clockwise direction about axis 24 by the upwardly moving flight.

Blade 26 becomes totally disengaged from the flight as soon as the latter has moved a certain distance about the periphery of drive sprocket 18. Once the blade is disengaged from a flight, the stripper unit by force of gravity resumes its normal position shown in FIG. 1, whereupon blade 26 is once again ready to engage the successive flight carried by the chains.

Other types of stripper units from that heretofore described may be utilized, if desired, to perform the stripping action.

Also mounted adjacent the top of wall 15 is a trough or chute 27 onto which the waste falls after having been stripped from a flight. The chute 27 may take various forms, see for example FIGS. 1, 5, and 6, and its function is to direct the stripped waste to a truck, railroad car, or the like, for transportation to a suitable location where it may be subjected to some type of reclaiming treatment or safely disposed of without causing harmful effects.

In the modified chutes 28 and 30, shown respectively in FIGS. 5 and 6, there is provided a plate 28a or 30a which has the lower side thereof pivotally connected to a laterally extending bracket 31 mounted on the exterior of the reservoir. The upper edges 28b or 30b of the plate projects above the upper edge, or top, of the reservoir wall 15 and terminates inwardly of the wall 15, and within the path of upward movement of the flights. The inward projection of plate edge 28b or 30b minimizes the amount of the stripped waste which falls back into the reservoir.

In order to prevent the chute plate 28 or 30 from obstructing the upward movement of the flights, each flight may be provided with an upwardly projecting stub or protuberance 31 disposed adjacent the distal end of the flight outer section. A stub 31 is disposed adjacent each end of the flight and outside of the waste contacting and supporting surface of the flight section so as not to interfere with the relative movement of the stripper blade 26. The stubs contact the underside of plate edge 28b or 30b as the flight moves upwardly and causes the plate to pivot counterclockwise out of the way of the flight. Once the flight has moved past the plate edge, the plate returns by gravity to its normal position, see FIGS. 5 and 6, prior to the flight being engaged by the stripper unit.

In FIG. 6, a second chute plate 30' is mounted beneath plate 30 and receives the stripped waste as it falls off the lower edge 30a of plate 30. Lower plate 30' may, in turn, direct the stripped waste to a suitable location for further disposition.

FIG. 4 discloses a modified form of flight 32 wherein the inner section 32a thereof is disposed substantially parallel to the direction of travel B when the flight is engaging the wall surface 15. The flight outer section 32b is not disposed transverse or perpendicular to the direction of travel B, as in the case of flight 21, but instead is askew with respect thereto, so as to form an obtuse included angle "b" with section 32a. Angle "b" may be the same shape as angle "a" previously discussed.

Because of the angular disposition of flight section 32b, a stripper unit may not be necessary if the waste carried by the flight section 32b is of such a type that it will automatically strip itself from the flight section by the force of gravity, after the flight section 32b has moved above the upper edge or top of wall 15.

Flights 21 and 32 as heretofore described have the inner and outer sections thereof of integral construction; however, if desired the flights may be of composite construction such as shown in FIG. 5. In FIG. 5, a flight 33 is illustrated which comprises a flat inflexible piece 33a forming the outer section and a second flat inflexible piece 33b forming the inner section. The pieces may be retained in the desired angular position by welding or other suitable means.

In the various forms of flights heretofore described, it is important that a wiping or sliding contact be effected between the distal end of the flight and the interior surface of wall 15. Furthermore, the flight should be formed of a suitable rugged material so as not to permit the contacted waste to pass therethrough as it is being moved by the flight up wall 15.

In instances where the interior surface of the reservoir side wall is not such as to permit an effective sliding contact with the flights, the reservoir vertical wall may be overlaid by a plate or sheet which presents a suitable surface for engagement by the flights or the assembly frame itself might be provided with such a plate.

The number of flights carried by the chains and the speed of travel of the chains will depend upon the type and amount of waste accumulated on the bottom of the reservoir. Actuation of the sprocket drive motor may be manual or automatically controlled by a suitable timing mechanism. Furthermore, if desired, a foraminous protective plate may be carried by the assembly frame for positioning above the upper run of chain disposed in the base section 13. Various bracing and reinforcing members for the assembly frame and/or reservoir have been purposely omitted from the drawings for clarity, as the utilization of such structural members is deemed well understood by those skilled in this art.

Thus, it will be seen that a conveyor assembly has been provided which is of simple, yet sturdy, construction, is capable of effectively and expeditiously handling various types and amounts of waste; and requires a minimum amount of maintenance.

While several embodiments of this invention have been described above, further modifications may be made thereto, and it is contemplated, therefore, by the appended claims, to cover any such modifications as fall within the true spirit and scope of this invention.

I claim:

1. A product handling apparatus comprising a vertical wall surface; a conveyor assembly having a section thereof disposed in spaced substantially parallel relation with respect to said surface and being movable upwardly with respect thereto; a plurality of vertically spaced product-contacting flights mounted on and movable with said conveyor section, each flight having an inner portion and an outer portion projecting therefrom for subtending and contacting the product while said flight is moving upwardly, the distal end of each flight outer portion being in substantial sliding contact with said surface while said flight is moving upwardly, the inner and outer portions of each flight defining an obtuse included angle; and an adjustable unit mounted adjacent the upper edge of said wall surface for initially contacting each flight upon the latter reaching a predetermined elevated position, said unit having a portion thereof in continuous engagement with said flight and being movable relatively toward the distal end of the flight outer portion as said flight continues its upward movement beyond said elevated position whereby the contacted product is stripped from said flight.

2. The apparatus of claim 1 wherein the obtuse angle-forming surface of each flight inner portion is disposed substantially parallel to said vertical wall surface while each flight is moving upwardly with respect to said wall surface.

3. The apparatus of claim 1 wherein the obtuse angle-forming surface of each flight outer portion is disposed substantially perpendicular to said vertical wall surface while each flight is moving upwardly with respect to said wall surface.

4. A product handling apparatus comprising a reservoir having side walls delimiting a bottom surface on which waste is caused to accumulate; a conveyor assembly disposed within said reservoir and having a base section overlying and in contact with said reservoir bottom, and a ramp section extending vertically from one side of said base section and in proximate relation with respect to a reservoir side wall, said ramp section having a height at least as great as the height of the proximate side wall; an endless conveyor common to and movable relative to said base and ramp sections; a plurality of flights mounted in spaced relation on said conveyor and movable therewith, each flight having an inner section and an outer section projecting therefrom and engageable successively with said reservoir bottom and side wall surfaces to effect removal of the accumulated waste from said bottom surface and upwardly along said side wall surface, each of said flights having the inner and outer sections thereof forming an obtuse included angle; and means adjacent the upper edge of said ramp section for effecting automatic removal of the waste subtended by said flight outer section when said flight has reached a predetermined elevated position, the means adjacent the upper edge of said ramp section includes an adjustably mounted stripper unit having a portion thereof initially contacting said flight inner setcion, when said flight reaches a predetermined elevated position, said unit portion moving relatively outwardly along said flight outer section as said flight continues its upward movement from said predetermined elevated position whereby the waste subtended by said flight outer section is stripped therefrom.

References Cited by the Examiner

UNITED STATES PATENTS

| 2,368,114 | 1/1945 | Cartlidge | 198—229 |
| 2,373,477 | 4/1945 | Klein | 198—176 |
| 2,636,593 | 4/1953 | Baehr | 198—229 |
| 3,229,807 | 1/1966 | Moore | 198—229 |

EVON C. BLUNK, *Primary Examiner.*

RICHARD E. AEGERTER, *Examiner.*